(12) United States Patent  
Kakimoto et al.

(10) Patent No.: US 10,866,341 B2  
(45) Date of Patent: Dec. 15, 2020

(54) PROBABILISTIC WEATHER FORECASTING DEVICE, PROBABILISTIC WEATHER FORECASTING METHOD, AND NON-TRANSITORY COMPUTER READABLE MEDIUM

(71) Applicant: KABUSHIKI KAISHA TOSHIBA, Tokyo (JP)

(72) Inventors: Mitsuru Kakimoto, Kanagawa (JP); Hiromasa Shin, Kanagawa (JP); Yusuke Endoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1060 days.

(21) Appl. No.: 15/258,585

(22) Filed: Sep. 7, 2016

(65) Prior Publication Data

US 2017/0075035 A1 Mar. 16, 2017

(30) Foreign Application Priority Data

Sep. 11, 2015 (JP) ................................. 2015-179686

(51) Int. Cl.  
*G01W 1/10* (2006.01)

(52) U.S. Cl.  
CPC .................................... *G01W 1/10* (2013.01)

(58) Field of Classification Search  
CPC .............. G01W 1/00; G01W 1/10; G06T 7/35  
See application file for complete search history.

(56) References Cited

U.S. PATENT DOCUMENTS

| 7,231,299 | B2 * | 6/2007 | Egi | ........................ G01W 1/00 |
| | | | | 702/3 |
| 2014/0294274 | A1 * | 10/2014 | Wang | ........................ G06T 7/35 |
| | | | | 382/131 |
| 2014/0343855 | A1 * | 11/2014 | AghaKouchak | ........ G01W 1/10 |
| | | | | 702/3 |

FOREIGN PATENT DOCUMENTS

| JP | 2005-249455 | 9/2005 |
| JP | 2007-187478 | 7/2007 |

(Continued)

OTHER PUBLICATIONS

James W. Taylor "A comparison of Temperature Density Forecasts from GARCH and Atmospheric Models" (Year: 2004).*

(Continued)

*Primary Examiner* — Regis J Betsch  
*Assistant Examiner* — Kaleria Knox  
(74) *Attorney, Agent, or Firm* — Finnegan, Henderson, Farabow, Garrett & Dunner, L.L.P.

(57) ABSTRACT

According to one embodiment, a probabilistic weather forecasting device includes processing circuitry configured to generate, based on a plurality of ensembles each including predicted values of the first meteorological variable and a plurality of pieces of observed data each including an observed value of the second meteorological variable, a simultaneous probability density distribution of a predicted value of the first meteorological variable and an observed value of the second meteorological variable; and configured to generate, based on the simultaneous probability density distribution, first probability density distributions each being a probability density distribution of an observed value of the second meteorological variable obtained under a condition that each of a plurality of predicted values of the first meteorological variable are given at a prediction target time, (Continued)

and synthesize the first probability density distributions to generate a second probability density distribution.

19 Claims, 12 Drawing Sheets

(56) References Cited

FOREIGN PATENT DOCUMENTS

| | | |
|---|---|---|
| JP | 2013-146540 | 8/2013 |
| JP | 2014-21555 | 2/2014 |
| JP | 2015-32173 | 2/2015 |
| JP | 2016-35719 | 3/2016 |

OTHER PUBLICATIONS

James Mitchell and Kenneth F.Wallis "Evaluation Density Forecasts: Forecast Combinations, Model Mixtures, Calibration and Sharpness" (Year: 2009).*

Palmer; "The Economic Value of Ensemble Forecasts as a Tool for Risk Assessment: From Days to Decades", Q. J. R. Meteorol. Soc., vol. 128, pp. 747-774, (2002).

Cheung et al.; "Ensemble Solar Forecasting Statistical Quantification and Sensitivity Analysis", National Renewable Energy Laboratory, pp. 1-6, (2015).

* cited by examiner

| OBSERVATION TIME | OBSERVATION LOCATION (LATITUDE) | OBSERVATION LOCATION (LONGITUDE) | SOLAR IRRADIANCE (W/m$^2$) |
|---|---|---|---|
| ... | ... | ... | ... |
| 2014/10/23 12:25 | 35.5 | 139.5 | 755 |
| 2014/10/23 12:26 | 35.5 | 139.5 | 712 |
| 2014/10/23 12:27 | 35.5 | 139.5 | 703 |
| 2014/10/23 12:28 | 35.5 | 139.5 | 755 |
| 2014/10/23 12:29 | 35.5 | 139.5 | 690 |
| 2014/10/23 12:30 | 35.5 | 139.5 | 591 |
| ... | ... | ... | ... |

| TIME | LOCATION (LATITUDE) | LOCATION (LONGITUDE) | SOLAR IRRADIANCE (W/m$^2$) | | | |
|---|---|---|---|---|---|---|
| | | | 1 | 2 | ... | M |
| ... | ... | ... | ... | | | |
| 2014/10/23 12:15 | 35.0 | 140.0 | 505 | 609 | 830 | 499 |
| 2014/10/23 12:20 | 35.0 | 140.0 | 750 | 720 | 913 | 502 |
| 2014/10/23 12:25 | 35.0 | 140.0 | 784 | 854 | 983 | 621 |
| 2014/10/23 12:30 | 35.0 | 140.0 | 659 | 690 | 813 | 687 |
| 2014/10/23 12:35 | 35.0 | 140.0 | 660 | 589 | 864 | 459 |
| 2014/10/23 12:40 | 35.0 | 140.0 | 513 | 591 | 722 | 440 |
| | ... | ... | ... | | | |

FIG. 3

PROBABILISTIC WEATHER FORECASTING DEVICE, PROBABILISTIC WEATHER FORECASTING METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2015-179686, filed on Sep. 11, 2015; the entire contents of which are incorporated herein by reference.

FIELD

Embodiments of the present invention relate to a probabilistic weather forecasting device, a probabilistic weather forecasting method, and a probabilistic weather forecasting program.

BACKGROUND

Weather forecasting addresses predictions of weather in the future. Since weather forecasting inevitably involves errors, the degree of reliability of weather forecasting is in many cases taken into account in a situation where a decision needs to be made based on the weather forecast. Some of the existing techniques for giving expression to the nature of dispersion of the prediction rely on parametric expressions of statistical distribution. Meanwhile, it has been generally accepted that there is difficulty in giving expressions to the complicated weather conditions only drawing upon a combination of a limited number of parameters. In the present day, the standard approach to evaluation of the uncertainty of the prediction is a scheme called "ensemble forecasting".

However, only a limited range of the uncertainties of the prediction can be taken into account in the ensemble forecasting. In practice, only errors of initial values of numerical computation are taken into account in many cases. As a result, the problem is that the uncertainties are underestimated (dispersion is not satisfactory) in many cases.

BRIEF DESCRIPTION OF THE DRAWINGS

FIG. 3 is a diagram illustrating an exemplary data structure of an ensemble storage;

DETAILED DESCRIPTION

According to one embodiment, a probabilistic weather forecasting device includes processing circuitry.

The processing circuitry is configured to generate, based on a plurality of ensembles each including predicted values of the first meteorological variable and a plurality of pieces of observed data each including a observed value of the second meteorological variable, a simultaneous probability density distribution of a predicted value of the first meteorological variable and an observed value of the second meteorological variable.

The processing circuitry is configured to generate, based on the simultaneous probability density distribution, first probability density distributions each being a probability density distribution of an observed value of the second meteorological variable obtained under a condition that each of a plurality of predicted values of the first meteorological variable are given at a prediction target time, and synthesize the first probability density distributions to generate a second probability density distribution.

Embodiments of the present invention are described below with reference to the drawings.

First Embodiment

Figures 1, 2:
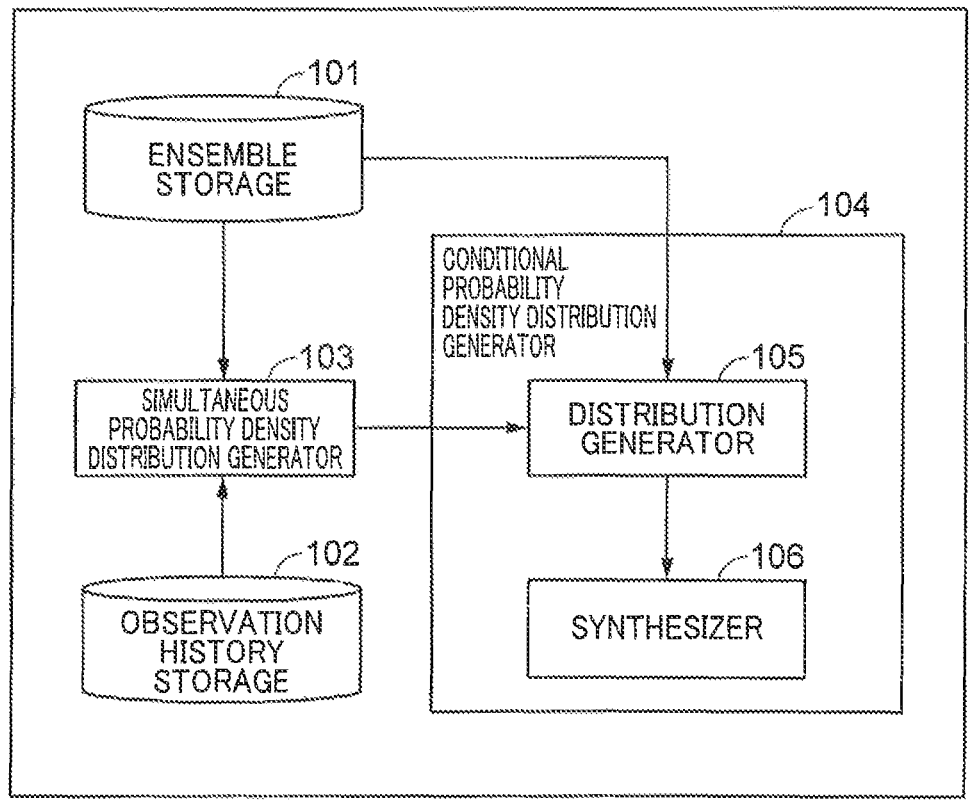
FIG. 1 is a block diagram of a probabilistic weather forecasting device in accordance with a first embodiment.
FIG. 2 is a diagram illustrating an exemplary data structure of an observation history storage.

FIG. 1 illustrates a probabilistic weather forecasting device in accordance with an embodiment of the present invention. This probabilistic weather forecasting device is configured, with regard to a meteorological variable as a prediction target, to estimate a probability density distribution of observed values of the meteorological variable at a prediction target time. This embodiment draws by way of example on solar irradiance which is important in terms of photovoltaic power generation or an index (clear sky index) based on the solar irradiance as an example of the meteorological variable. However, the meteorological variable for which the prediction is carried out is not limited to a particular meteorological variable and the prediction can be carried out for other meteorological variables.

The probabilistic weather forecasting device of FIG. 1 includes an ensemble storage 101, an observation history storage 102, a simultaneous probability density distribution generator 103, and a conditional probability density distribution generator 104. The simultaneous probability density distribution generator 103 is a "first distribution generator" in accordance with this embodiment. The conditional probability density distribution generator 104 is a "second distribution generator" in accordance with this embodiment. The conditional probability density distribution generator 104 includes a distribution generator 105 and a synthesizer 106. The simultaneous probability density distribution generator 103 and the conditional probability density distribution generator 104 can be implemented by processing circuitry such as a hardware processor, CPU or dedicated circuitry.

The observation history storage 102 stores observation history of observed values of the meteorological variable that have been observed by sensors. The observation history includes a plurality of pieces of observed data. Each piece of the observed data includes an observed value, an observation location, and an observation time. If the meteorological variable is solar irradiance, a pyranometer can be used as the sensor. The sensors are arranged on a per-observation-location basis to measure the observed values. The observed values measured at the observation locations are received from an external device along with information on the observation location and the observation time. The observed values, the observation locations, and the observation times are stored in the observation history storage 102.

FIG. 2 illustrates an example of a data structure of the observation history storage 102. The observation location is expressed by latitude and longitude. Solar radiation intensities at one-minute intervals are stored along with the observation locations (latitude; longitude) in the observation history storage 102. Although only one location (35.5, 139.5) is indicated in FIG. 2, multiple locations will be stored in practice therein.

The observed values may be measured, for example, once in every predetermined period of time by the sensors installed at the individual observation locations and transmitted to this device along with the observation location and the observation time and they may be stored in the observation history storage 102. A collection device that collects the observed values of the sensors may be provided so that the observed values from the individual sensors may be received from the collection device along with the observation location and the observation time, so that the observed values, the observed locations, and the observation times may be stored in the observation history storage 102.

The ensemble storage 101 stores ensemble forecasting data. The ensemble forecasting data includes multiple pieces of data including time, location, M predicted values of the meteorological variable (M is an integer larger than or equal to two). A set of M predicted values are referred to as "ensemble". Also, each of the M predicted values are referred to as a "member" of the ensemble. The ensemble forecasting data can be obtained by numerical weather forecasting (numerical meteorological simulation) which will be described later. The time and the location included in the ensemble forecasting data, i.e., the time and location calculated by the numerical meteorological simulation may be referred to as "prediction time" and "prediction location", respectively, in order to distinguish them from the observation location and the observation time included in the observed data.

FIG. 3 illustrates an example of a data structure of the ensemble storage 101. Times, locations, and ensembles each including M predicted values (M members) of the meteorological variable are recorded. The meteorological variable is solar irradiance. The location that corresponds to a "first meteorological variable" in accordance with this embodiment is indicated by latitude and longitude. The meteorological variable of the observation history stored in the above-described observation history storage 102 corresponds to a "second meteorological variable" in accordance with this embodiment.

The meaning of the individual members of the ensemble may vary depending on the methods of numerical meteorological simulation. By way of example, in a case of a method of simulation according to which simulations with conditions slightly different from each other are performed in parallel with each other, the values of the individual members indicates the solar radiation intensities at the same prediction location calculated on a per-condition basis in the simulations. In other words, in this case, all the prediction locations of the members coincide with each other. As another example, in the numerical meteorological simulation, only one condition is specified, and one of the members indicates the solar irradiance at the prediction location in this simulation, and the other members indicate the solar radiation intensities at the surrounding locations with reference to the prediction location among the grid points of the simulation (although the details will be described later, this takes into account the fact that the predicted values of the surrounding locations may be identical or similar to the predicted value of the prediction location depending on the cases). In this embodiment, either one of them can be implemented. In either case, the individual members of the ensemble indicate the predicted values of the meteorological variable in the prediction location at the prediction time.

Although only one location (35.0, 140.0) is indicated in FIG. 3, multiple locations will be recorded in practice. Also, although only the solar irradiance is indicated as the meteorological variable in FIG. 3, other meteorological variable may be recorded. For example, meteorological variables such as atmospheric temperature, pressure, wind speed, and wind direction may be recorded. Also, in the cases of the meteorological variables such as atmospheric temperature, pressure, wind speed, and wind direction, altitude may be included as a value indicative of a location in addition to the latitude and the longitude. In other words, in the cases of these atmospheric variables, three-dimensional data including latitude, longitude, and altitude is recorded.

In normal cases, weather forecasts are provided based on the global-level forecasts periodically issued by organizations of major countries (Japan Meteorological Agency, European Centre for Medium-Range Weather Forecasts (ECMWF), etc.). The ensemble may be obtained periodically according to the time schedule of the forecasts presented by these organizations and stored in the ensemble storage 101.

It should be noted that the prediction time and the prediction location recorded in the ensemble storage 101 does not need to agree with the observation time and the observation location recorded in the observation history storage 102. When they do not coincide with each other, the data of the ensemble storage 101 may be used by appropriate interpolation carried out for the observation time and the observation location of the observation history storage 102. In the following, the data of the ensemble storage 101 that has been subjected to the appropriate interpolation is used, or explanations are described with the former and the latter regarded as agreeing with each other.

Here, details of the numerical weather forecasting (numerical meteorological simulation) and the ensemble are described. The numerical weather forecasting is computer-based numerical computation of the scheme of motion of the atmosphere and time-series evolution (dynamics) thereof. In normal cases, this dynamics is deterministic and the probabilistic nature is not built in it. However, if there is any indefinite factor in the system, it is important to express the probabilistic nature. In the case of the numerical weather forecasting, there are uncertainties such as uncertainty of the initial value and uncertainty of dynamics.

In the case of the numerical weather forecasting, time-series evolution starting from a certain initial value of the atmospheric state (pressures at the individual locations, wind speed, wind direction, temperature, amount of water vapor, etc.) and thereafter is calculated. However, observed data for obtaining the initial value are limited in terms of the observation locations and the types of the observation targets. Also, an observation error may occur. As a result, it is not possible to uniquely determine the initial values of the atmospheric states at the individual locations. Thus the initial values of the atmospheric states at the individual locations will be estimated statistically on the basis of the observed values (the values of the meteorological variable at the individual locations are estimated). As a result, the initial values at the individual locations need to be probabilistically expressed.

Also, meteorological dynamics is constructed based on the physical phenomena such as hydrodynamics and thermodynamics and the present-day level of understanding of the phenomena has been developed. However, many aspects of the phenomena are yet to be elucidated. In particular, in terms of the need of the numerical computation, the space is divided into discrete grid points to represent a continuous state, which in many cases necessitate a certain type of approximation. As a result, dynamics, which also entails uncertainty, needs to be expressed in a probabilistic manner.

As a means of expressing the probabilistic nature, a method called "ensemble" is available. A result of one meteorological numerical computation only expresses a time-series evolution (which is referred to as "path") based on one initial value and one defined dynamics. As a result, multiple paths are created to give expression to the probabilistic nature. A set of the paths is called "ensemble".

In order to give expression to the uncertainty of the initial value, a plurality of initial values are generated by using random numbers or the like and thereby causing perturbation to an initial value, and paths for each of them are created. The ensemble that has been created in this manner is called "initial value ensemble". Also, in order to give expression to the uncertainty of the dynamics, a plurality of numerical weather models are created within the numerical weather forecasting model by using random numbers and thereby causing perturbation to the parameter indicative of the nature of the dynamics, and paths for each of them are created. This is called "model ensemble".

The method of creating multiple paths in the numerical weather forecasting as described above is a typical ensemble creation method. It can be said that the ensemble in its broad sense is a set of predicted values at individual times of day of the prediction target (meteorological variable). Given this interpretation, it is also possible to generate the ensemble as illustrated below.

Figure 4:
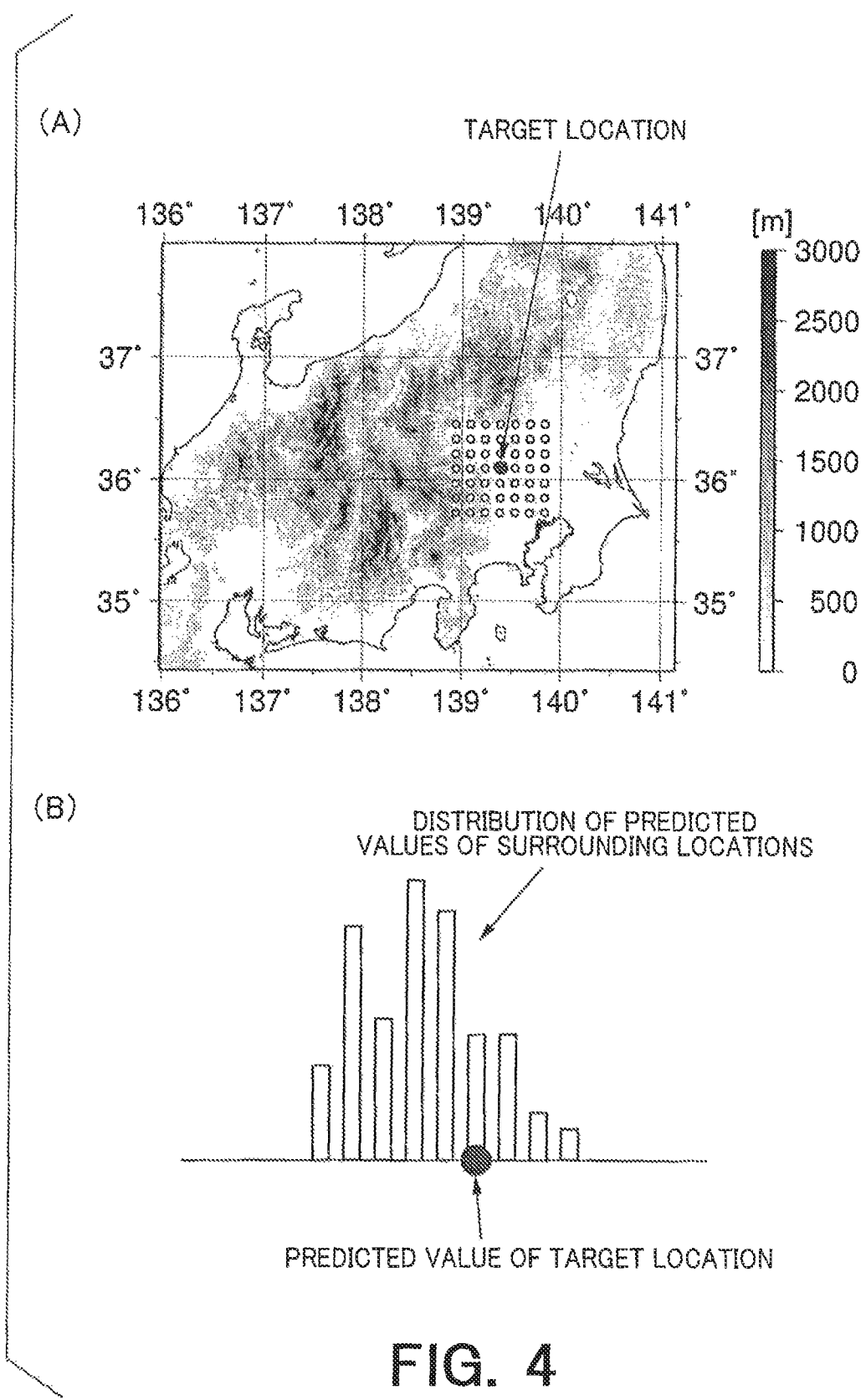
FIG. 4 is a diagram illustrating an exemplary arrangement of a target location and its surrounding locations and an example of distribution of predicted values of the target location and the surrounding locations.

As an error of numerical weather forecasting, it is known that phase errors frequently occur. The phase error denotes the fact that prediction of a meteorological pattern is basically correct but a phase gap exists when the pattern is more finely observed. When the nature of the error occurring in the numerical weather forecasting is taken into account, it is possible that prediction about any one of the locations around the prediction target location accurately represents the weather at the target location. When this fact is taken into account, an ensemble can be created by collecting predicted values at surrounding locations around the target location. FIG. 4(A) illustrates an example of the target location and its, surrounding locations. FIG. 4(B) illustrates an example of a distribution of the predicted values of the target location and the surrounding locations. If the same weather (i.e., the same or similar predicted values) is observed at the target location and its surrounding locations covering a wide area, then the distribution will have an acute peak with this weather at the center of the distribution, and the weather indicated by the predicted value of that target location is likely to be realized. In contrast, if the weather spatially and substantially varies at the target location and its surrounding locations, then the width of the distribution is also extended and it can be said that the uncertainty of prediction given to the target location is high. In this manner, an ensemble that is created from the predicted values at the surrounding locations around the target location is a reasonable one. Specifically, if a predetermined number N is defined with the prediction target point regarded as the center, then the predicted values of N×N grid points of the numerical meteorological simulation can be obtained and brought together to constitute an ensemble.

In this embodiment, as has been described with reference to FIG. 3, an ensemble that brings together these predicted values of the target location and the surrounding locations (multiple grid points) may be relied on, and the above-described initial value ensemble and the model ensemble may be relied on. In sum, any ensemble may be relied on as long as it brings together a plurality of predicted values of the meteorological value with respect to the prediction time and the prediction location.

The simultaneous probability density distribution generator (first distribution generator) 103 is configured to generate a simultaneous probability density distribution of the predicted values of the meteorological variable and the observed values of the meteorological variable on the basis of the ensemble forecasting data stored in the ensemble storage 101 and the observation history stored in the observation history storage 102. It is assumed in this embodiment that the meteorological variable (first meteorological variable) of the predicted value and the meteorological variable (second meteorological variable) of the observed value are the same variable. Nevertheless, these meteorological variables may differ from each other, as the other embodiments to be described later. In the following, the generation of the simultaneous probability density distribution is described in detail.

The simultaneous probability density distribution refers to a probability distribution regarding the probability of two events A and B occurring simultaneously. Here, the simultaneous probability density distribution refers to a simultaneous probability distribution regarding the solar irradiance (predicted solar irradiance) indicated by the predicted values and the solar irradiance (observed solar irradiance) indicated by the observed values. In the following, a clear sky index is introduced in place of the solar irradiance. The clear sky index is given by the following expression.

[Math 1]

$$\text{Fair weather index} = \frac{\text{Solar radiation intensity}}{\text{Fair weather solar radiation intensity}}$$

The clear sky index may take any value in the range from 0 to 1 (i.e., [0, 1]). In order to distinguish the observed solar irradiance and the predicted solar irradiance from each other, the observed solar irradiance is indicated by "R" and the predicted solar irradiance by "r". Also, simultaneous probability density distribution of these two intensities is indicated by "p (r, R)".

Figure 5:
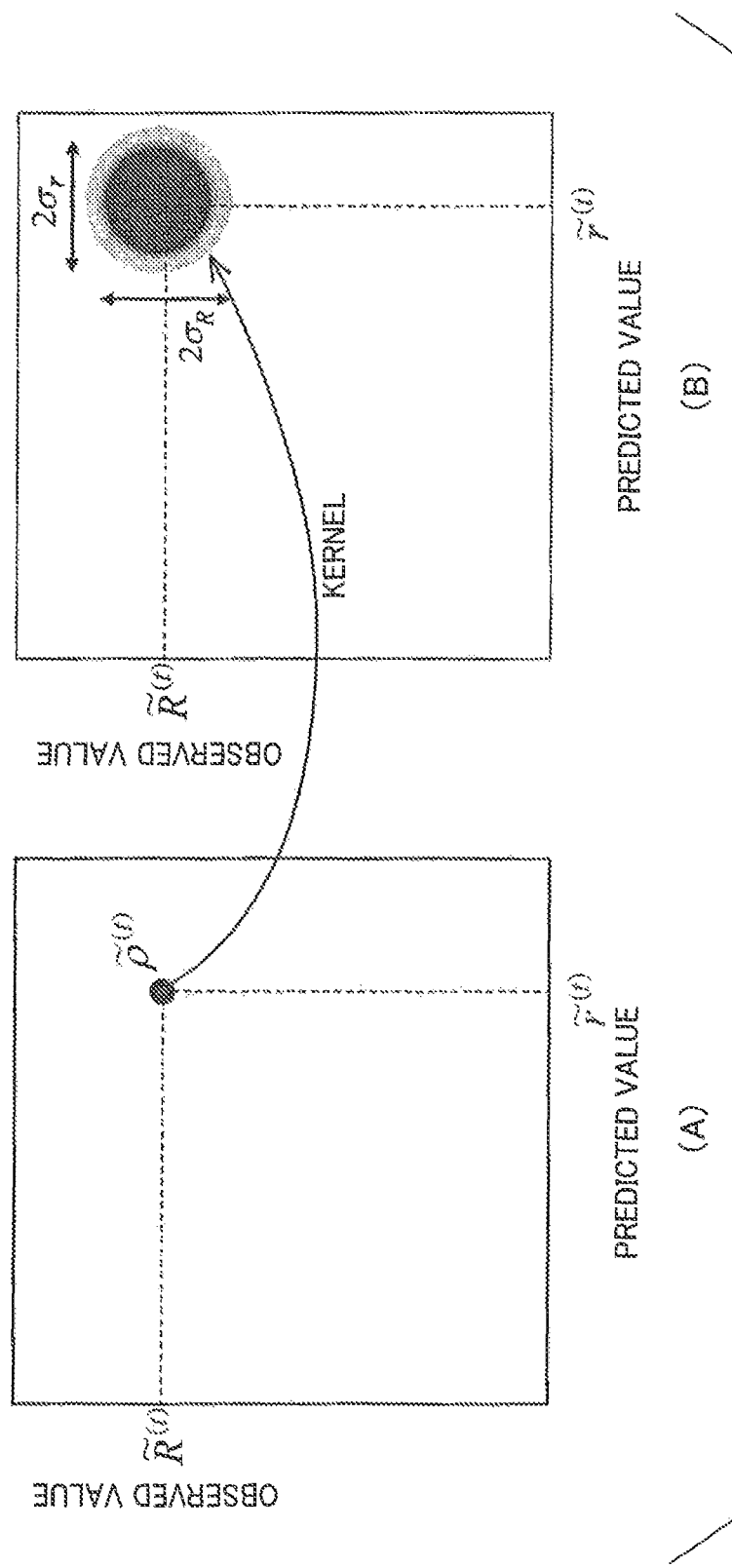
FIG. 5 is a diagram for explanation of an estimation method to estimate a simultaneous probability density distribution.

In the following, the method of estimation of the simultaneous probability density distribution using kernel density estimation is described. FIG. 5 is a diagram for explanation of this method. Suppose that the clear sky index (observed clear sky index) is observed as an observed value at a certain observation point at a certain time "t" in the past. The clear sky index is expressed by:

$$\tilde{R}^{(t)}$$ [Math 2]

A predicted value (predicted clear sky index) of the clear sky index obtained by numerical weather forecasting at this observation point at the time "t" is expressed by:

$$\tilde{r}^{(t)}$$ [Math 3]

The predicted value of the prediction performed in the past, and the observed value of the observation performed in the past are represented by letters with a tilde added over them when they are to be used in the future prediction. The observed clear sky index $$\tilde{R}^{(t)}$$ [Math 4]

and the predicted clear sky index $$\tilde{r}^{(t)}$$ [Math 5]

can be represented as illustrated in FIG. 5(A) by the point on a plane whose horizontal axis represents the predicted clear sky index (predicted value) and whose vertical axis represents the observed clear sky index (observed value):

$$\tilde{\rho}^{(t)} = (\tilde{r}^{(t)}, \tilde{R}^{(t)})$$ [Math 6]

In the kernel density estimation, a kernel density function is associated with the point on this plane as illustrated in FIG. 5(B). In general, the mixture of normal distributions is used as the kernel density function as expressed by the Expression (1). The kernel density function corresponds to the "third probability density function" in accordance with this embodiment. As the third probability density function, functions or probability density distributions other than the kernel density function may be used.

[Math 7]

$$K(\rho, \tilde{\rho}^{(t)}) = \frac{1}{\sqrt{(2\pi)^2 |\Sigma|}} \exp\left[-\frac{1}{2}(\rho - \tilde{\rho}^{(t)})^T \Sigma^{-1} (\rho - \tilde{\rho}^{(t)})\right]$$ Expression (1)

where

[Math 8]

$$\rho = (r, R)$$

and

[Math 9]

$$\Sigma = \begin{bmatrix} \sigma_r^2 & 0 \\ 0 & \sigma_R^2 \end{bmatrix}$$

[Math 10]

$$\sigma_r, \sigma_R$$

represent the magnitudes of the breadth of the kernel density function in the predicted clear sky index axis and the observed clear sky index axis, respectively. They each correspond to standard deviation. $|\Sigma|$ which is expressed as follows represents a discriminant of $\Sigma$.

$$|E| = \sigma_r^2 \sigma_R^2$$ [Math 11]

With regard to a certain prediction target location, each of predicted values (predicted clear sky indexes) of a plurality of members at a certain time is combined with a corresponding observed value at the time (observed clear sky indexes) and multiple pairs "(predicted clear sky index, observed clear sky index)" are generated. This procedure is carried out for multiple times of day. Thus, multiple pairs for multiple times of day are obtained for each member. They can be expressed as:

$$\{\tilde{\rho}_1^{(t0)}, \tilde{\rho}_1^{(t0+1)}, \ldots, \tilde{\rho}_1^{(t1)}\}, \ldots, \\ \{\tilde{\rho}_M^{(t0)}, \tilde{\rho}_M^{(t0+1)}, \ldots, \tilde{\rho}_M^{(t1)}\}$$

Figure 6:
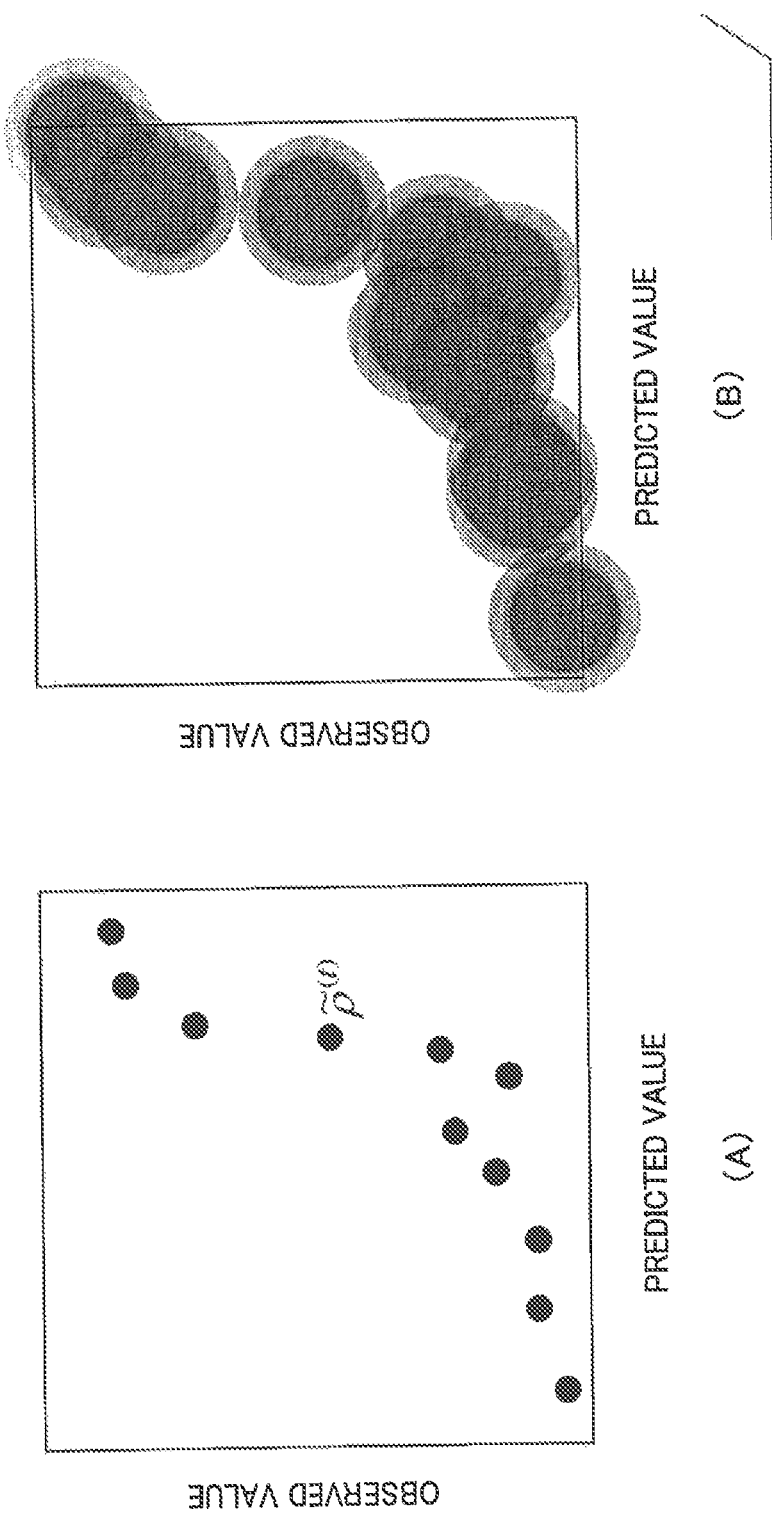
FIG. 6 is a diagram for explanation of an estimation method to estimate a simultaneous probability density distribution.

If N represents the number of times of day, then $N = t_1 - t_0 + 1$, M represents the number of members of the ensemble. FIG. 6(A) illustrates an example where the individual pairs are arranged in a coordinate system whose axes represent the predicted value (predicted clear sky index) and the observed value (observed clear sky index), respectively. Although more pairs will be arranged in practice, only a rough sketch of the pairs is illustrated for simplicity of notation. FIG. 6(B) illustrates a state where kernel density functions are associated with the individual locations in FIG. 6(A), Kernel density functions are associated with the individual pairs at multiple times of day for each member, and added up, as a result of which the simultaneous probability density function can be obtained as expressed by the following Expression (2),

[Math 13]

$$p(r, R) = \frac{1}{MN} \sum_{m=1}^{M} \sum_{t=t_0}^{t_1} K(\rho, \tilde{\rho}_m^{(t)})$$ Expression (2)

Figure 7:
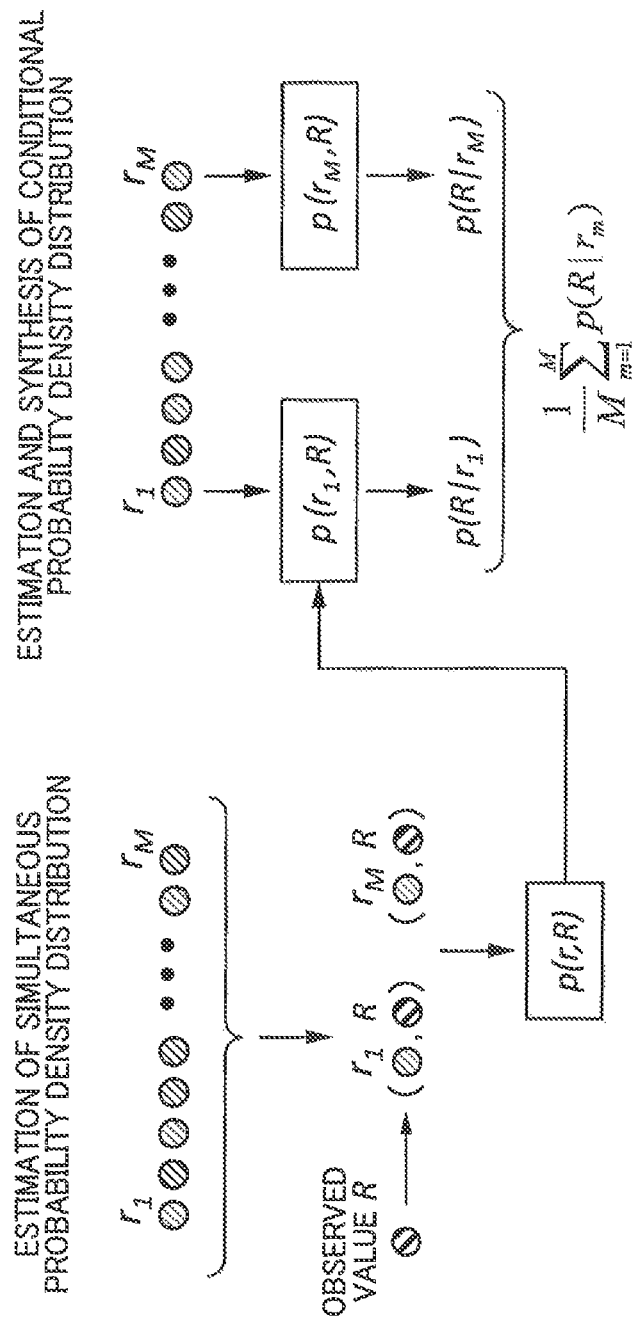
FIG. 7 is a diagram for explanation of operation of the first embodiment.

FIG. 7 (the left portion) is a rough sketch of how the generation process proceeds to generate the above-described simultaneous probability density distribution. In the left portion of FIG. 7, a plurality of predicted clear sky indexes (members 1 to M) at a certain time of day is given as:

$$r_1^{(t)}, r_2^{(t)}, \ldots, r_M^{(t)}$$ [Math 14]

In this illustrated example, each of the predicted clear sky indexes is combined with an observed clear sky index (observed value) and thus multiple pairs are generated (note that the notation "(t)" is omitted in the figure).

The conditional probability density distribution generator 104 (second distribution generator) generates a probability density distribution (conditional probability density distribution) of observed clear sky indexes at a prediction target time in a case where predicted clear sky indexes are given. The probability density distribution (conditional probability density distribution) is generated on the basis of the simultaneous probability density distribution which has been generated by the simultaneous probability density distribution generator 103 and the predicted clear sky indexes at a certain time in the future (prediction target time). The conditional probability density distribution generator 104 includes a distribution generator 105 and a synthesizer 106.

The distribution generator 105 is configured to obtain the conditional probability density distribution of the observed clear sky index on the basis of the above-described simultaneous probability density distribution in the case where predicted clear sky indexes for each of the members of the ensemble at the prediction target time are given. The conditional probability density distribution for each member corresponds to the "first probability density distribution" in accordance with this this embodiment. The amount of solar radiation at the prediction target time is stored in the ensemble storage and accordingly the clear sky index of each member at the prediction target time may be calculated from the solar irradiance of each member at the prediction target time.

Here, the conditional probability density distribution of the observed values of the clear sky index at the above-described prediction target time can be obtained using the following general Expression (3) that gives the conditional probability density distribution. In the Expression (3), "R" represents the clear sky index. Since "R" takes a value in the range [0, 1], the integration range of R in the denominator of Expression (3) is [0, 1].

[Math 15]

$$p(R \mid r) = \frac{p(r, R)}{\int p(r, R) dR} \quad \text{Expression (3)}$$

Figure 8:
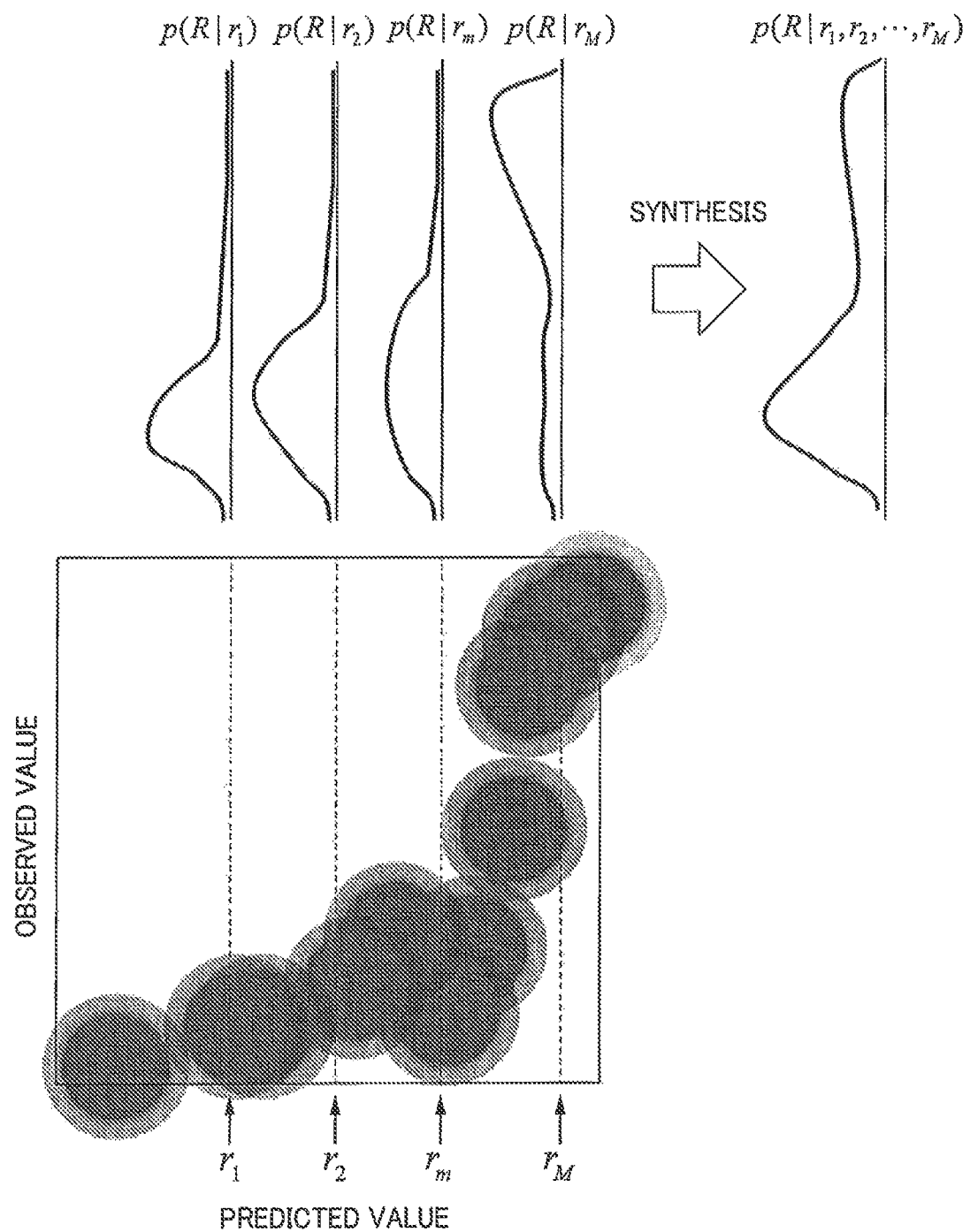
FIG. 8 is a diagram for explanation of the operation of the first embodiment.

The predicted clear sky index for each member at the prediction target time is given in accordance with Expression (3) and thus the conditional probability density distribution for each member is calculated. A rough sketch of this processing is illustrated in the right portion of FIG. 7 and FIG. 8. Specifically, when the predicted value at the prediction target time "t", i.e., $$r_m^{(t)} \quad \text{[Math 16]}$$

is given, this predicted value is assigned to Expression (3), and the conditional probability density distribution of the observed clear sky index, i.e., $$p(R \mid r_m^{(t)}) \quad \text{[Math 17]}$$

can be calculated (note that the notation "(t)" is omitted in FIGS. 7 and 8). It should be noted that the distribution of the observed value (observed clear sky index) and the predicted value (predicted clear sky index) in the lower left portion of FIG. 8 corresponds to FIG. 6(B).

The synthesizer 106 synthesizes the conditional probability density distributions of all the members of the ensemble at the prediction target time "t" and thereby calculates the conditional probability density distribution of the observed clear sky index in the case where the predicted values of all the members 1 to M of the ensemble (predicted clear sky index) are given. The conditional probability density distribution in the case where the predicted values of all the members are given corresponds to the "second probability density distribution" in accordance with this embodiment. Specifically, the conditional probability density distribution of the observed clear sky index in the case where the predicted clear sky indexes of all the members 1 to M of the ensemble are given is calculated according to the following Expression (4) on the assumption that the probabilities of realization of the individual members of the ensemble are identical to each other and given as 1/M.

[Math 18]

$$p(R \mid r_1^{(t)}, r_2^{(t)}, \ldots, r_M^{(t)}) = \frac{1}{M} \sum_{m=1}^{M} p(R \mid r_m^{(t)}) \quad \text{Expression (4)}$$

Although weights of the members are identical to each other in this illustrated example, the individual members may have different weights. FIG. 8 and the lower right portion of FIG. 7 illustrates how the conditional probability density distribution of the observed clear sky index of the individual members is synthesized (note that the notation "(t)" is omitted in the figure). By virtue of this, the conditional probability density distribution of the observed clear sky index at the prediction target time in the case a plurality of predicted clear sky indexes are given is obtained.

The conditional probability density distribution of the observed clear sky index at the prediction target time thus obtained can be applied to various cases. For example, as an example where probabilistic weather forecasting is necessary, a countermeasure against disaster may be mentioned. When occurrence of a disaster is predicted, the countermeasures against the disaster may include protection or evacuation of important resources. However, the countermeasures usually need predetermined costs. Accordingly, it is necessary to determine whether or not the countermeasures should be implemented taking into account the magnitude of the damage when the disaster has occurred, costs of the countermeasures, and probability of the occurrence of the disaster. In the case of photovoltaic power generation, when insufficiency of the amount of solar radiation is predicted, a possible countermeasure is to activate a thermal power generation system in advance. However, when the prediction of the insufficiency of the amount of solar radiation fails to hit the mark badly, the costs incurred by activation of the thermal power generation system contribute to nothing. For this reason, it is necessary to determine by probabilistic trial calculation whether or not the countermeasure really pays. In such a case, probabilistic prediction of the amount of solar radiation or an indicator based on the amount of the solar radiation (observed clear sky index) becomes necessary. If such probabilistic prediction is provided, countermeasures based on the probabilistic prediction are allowed to be implemented.

In the following, the operation of this embodiment is described with reference to the flowcharts of FIGS. 9 and 10. This operation mainly includes a simultaneous probability density distribution generation phase and a probabilistic prediction phase. Since weather forecasting is often used to create plans for the next day, an example is illustrated as a typical one where the simultaneous probability density distribution generation phase and the probabilistic prediction phase are successively carried out at a proper time of the preceding day (e.g., 12:00 of the preceding day) so as to create the prediction for the entire day. However, since these phases can be independently carried out, it is not essential for these phases to be successively carried out.

Figure 9:
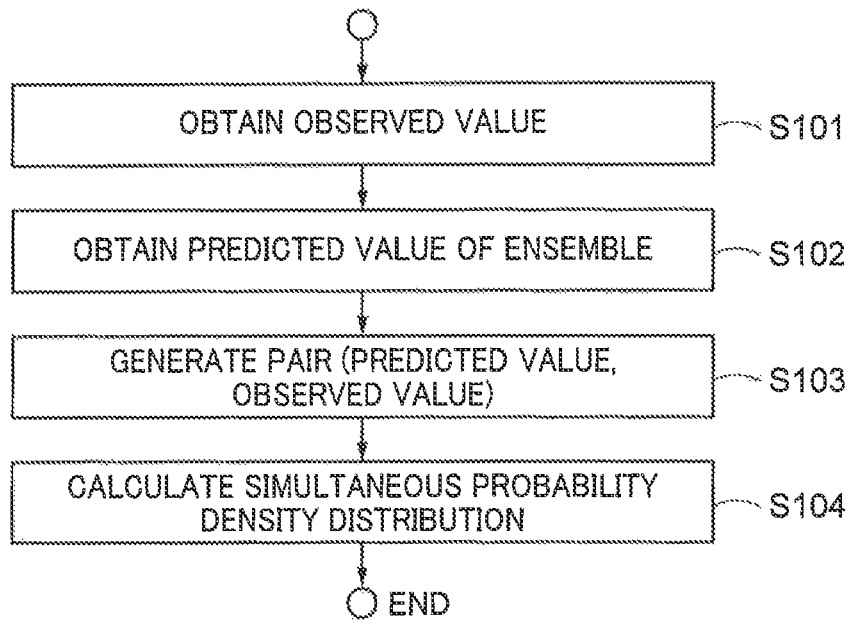
FIG. 9 is a diagram illustrating a flowchart of operation of a simultaneous probability density distribution generation phase.

FIG. 9 illustrates a flowchart of the operation of the simultaneous probability density distribution generation phase.

In the step S101, the simultaneous probability density distribution generator 103 obtains from the observation history storage 102 the observed data that is necessary for generation of the simultaneous probability density distribution. In this example, for the purpose of prediction of the probability density distribution of the observed value of the meteorological variable on a certain day, it is assumed that data for a period including L days before the day at issue is to be used. When the value L is small, the accuracy of the simultaneous probability density is decreased. Meanwhile, when the value L is too large, inappropriate data may be used due to the effects of seasonal changes or the like. Accordingly, it is desirable that the value L be properly adjusted. In typical cases, the value L corresponds to one month (L=30).

In the step S102, the simultaneous probability density distribution generator 103 obtains from the ensemble storage 101 the ensemble forecasting data that is necessary for creation of the simultaneous probability density. The range of the period of the ensemble forecasting data to be obtained is set, by way of example, to be equal to that of the observed data.

In the step S103, the simultaneous probability density distribution generator 103 generates pairs p=(r, R) of the predicted value r and the observed value R of the same time. More specifically, there exist predicted values of the same time by the number M of the members of the ensemble, and it is represented by $\{r_1, r_2, \ldots, r_m\}$. Pairs of the predicted value and the observed value R for all the members 1 to M are generated as follows. These pairs are generated for the individual times of the above L days.

$$(r_1, R), (r_2, R), \ldots, (r_M, R) \qquad \text{[Math 19]}$$

In the step S104, the simultaneous probability density distribution generator 103 uses the pair of the predicted value and the observed value obtained in the step S103 and creates the simultaneous probability density distribution p (r, R) by the kernel density estimation (see Expression (2)).

Figure 10:
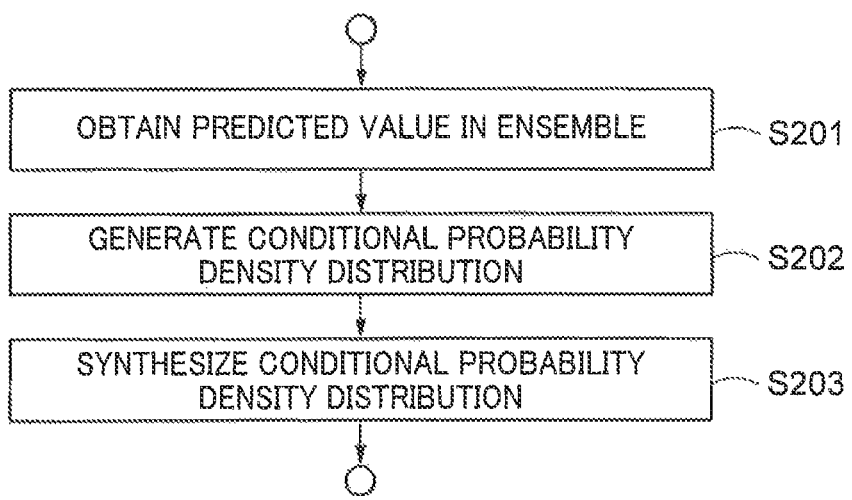
FIG. 10 is a diagram illustrating a flowchart of a probabilistic prediction phase.

FIG. 10 illustrates the flowchart of the operation of the probabilistic prediction phase.

In the step S201, the distribution generator 105 of the conditional probability density distribution generator 104 extracts the predicted value of the ensemble at the future time (prediction target time) "t"

$$r_1^{(t)}, r_2^{(t)}, \ldots, r_M^{(t)} \qquad \text{[Math 20]}$$

from the ensemble storage 101.

In the step S202, the distribution generator 105 calculates the conditional probability density distribution for each member on the basis of the simultaneous probability density distribution generated by the simultaneous probability density distribution generator 103 in accordance with the above-described Expression (3). Specifically, conditional probability density distribution is obtained from the simultaneous probability density distribution with regard to the each of the predicted values of all the members of the ensemble at the prediction target time $$r_1^{(t)}, r_2^{(t)}, \ldots, r_M^{(t)} \qquad \text{[Math 21]}$$

In other words, $$p(R|r_m^{(t)}) \qquad \text{[Math 22]}$$

(m=1, 2, . . . , M) is obtained.

In the step S203, the synthesizer 106 of the conditional probability density distribution generator 104 synthesizes the conditional probability distributions of the individual members on the basis of the above-described Expression (4). By virtue of this, the conditional probability density distribution of the observed value R at the prediction target time "t" is obtained.

Figure 11:
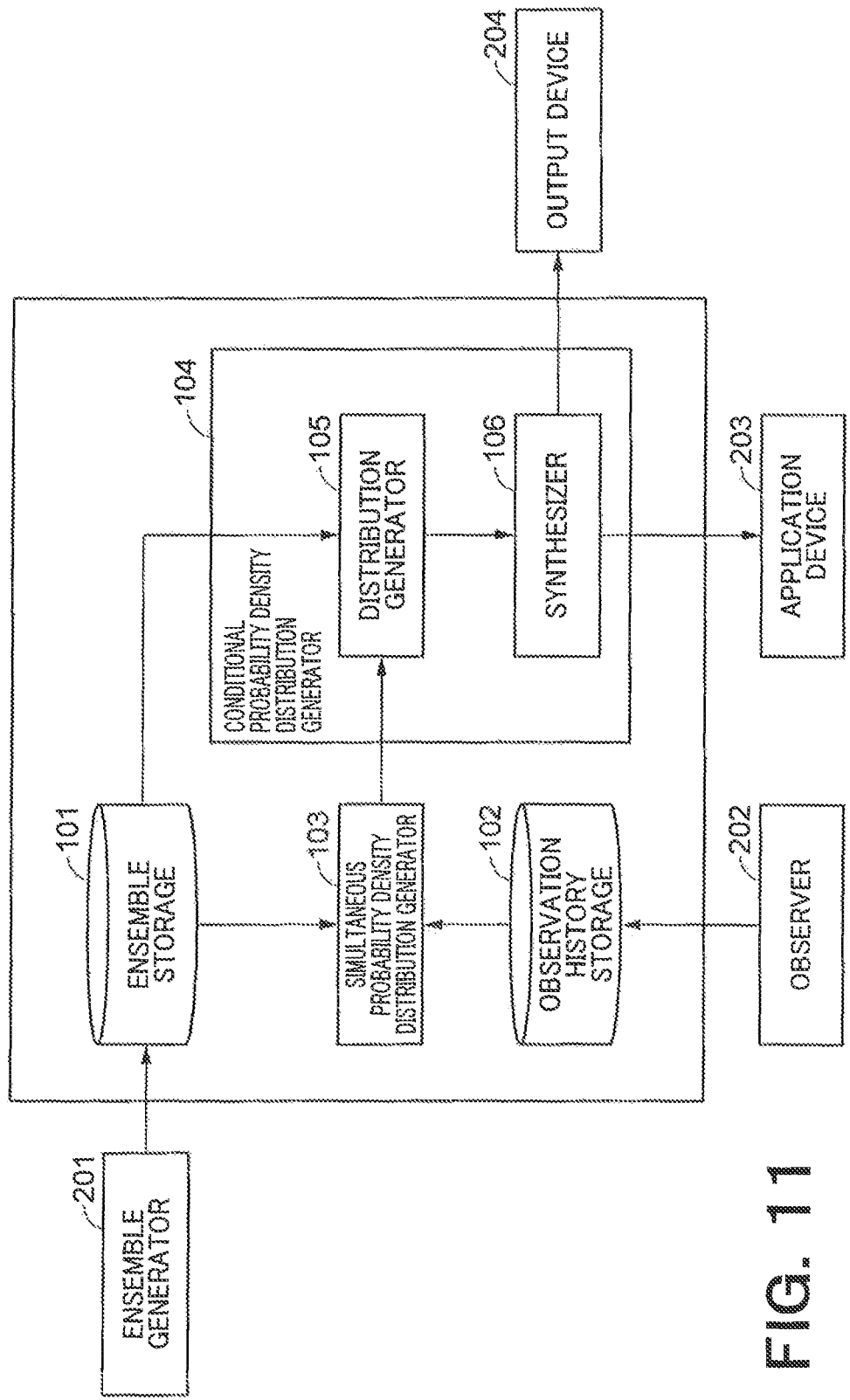
FIG. 11 is a diagram illustrating a system that includes the probabilistic weather forecasting device in accordance with the first embodiment.

FIG. 11 illustrates the overall configuration of a system that includes the probabilistic weather forecasting device in accordance with this embodiment. This system includes the probabilistic weather forecasting device of FIG. 1, an ensemble generator 201, an observer 202, an application device 203, and an output device 204.

The ensemble generator 201 is configured to generate the ensemble forecasting data as illustrated in FIG. 3 and transmit the generated ensemble forecasting data to the probabilistic weather forecasting device. The probabilistic weather forecasting device is configured to store the ensemble forecasting data that has been received from the ensemble generator 201 in the ensemble storage 101. The ensemble forecasting data may be data created by a public agency such as a national meteorological agency or a private organization, and, in this context, the ensemble generator 201 may be a device owned by that agency or organization or their outsourcing contractors. The ensemble forecasting data may be received at predetermined time intervals or at a predetermined timing from the ensemble generator 201. The ensemble forecasting data stored in the ensemble storage 101 includes not only data of past time but also data of future time with reference to the current time.

The observer 202 is configured to measure the values of the meteorological variable by using the sensors arranged for the observed values and transmit the observed data that includes the observed value, the observation location, and the observation time to the probabilistic weather forecasting device. The probabilistic weather forecasting device is configured to store the observed data that has been received from the observer 202 in the observation history storage 102. The observed data may be received from the observer 202 at predetermined time intervals or at a predetermined timing.

The application device 203 is configured to receive the conditional probability density distribution generated by the synthesizer 106 and carry out various determination processes on the basis of the received distribution. For example, the possibility of insufficiency of the amount of solar radiation may be calculated on the basis of the distribution and whether or not a thermal power generation system should be activated in advance may be performed in terms of the costs associated with the activation of the thermal power generation system. Any processes may be performed by the application device 203 and the process to be performed by the application device 203 is not limited to a particular one.

The output device 204 is configured to receive the conditional probability density distribution generated by the synthesizer 106 of the probabilistic weather forecasting device and display the received distribution on a screen. A user is allowed to perform various determinations by referring to the conditional probability density distribution displayed on the display device. The result of determination by the application device 203 may be transmitted to the output device 204 and the result may be displayed on the screen. The user may perform various determinations by referring to the result.

Figure 12:
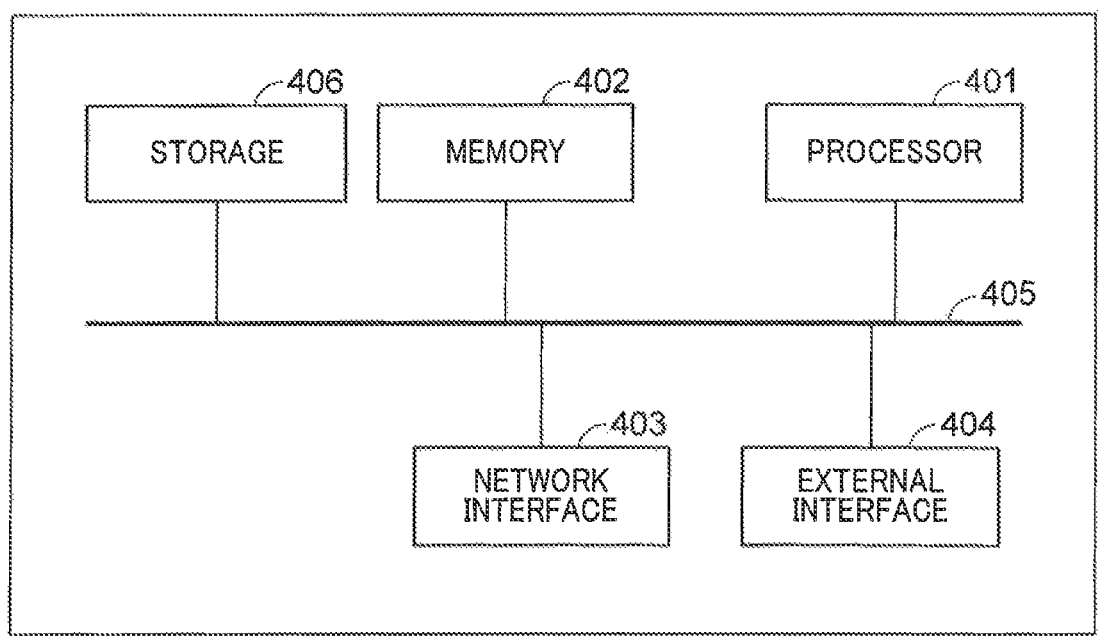
FIG. 12 is a diagram illustrating an example of a hardware configuration of the probabilistic weather forecasting device in accordance with the first embodiment.

FIG. 12 illustrates an example of hardware configuration of the probabilistic weather forecasting device in accordance with this embodiment. The probabilistic weather forecasting device of FIG. 12 includes a processor 401 which is a hardware processor such as a CPU, a memory 402, a network interface 403, an external interface 404, and a storage 406, which are interconnected via a bus 405. The processor 401 is one example of processing circuitry.

The network interface 403 is connected to a wired or wireless network and carries out communications with external devices via the network. Although only one network interface is illustrated in the illustrated example, multiple network interfaces may be incorporated. The network interface 403 may communicate with at least one of the ensemble generator 201, the observer 202, the application device 203, and the output device 204 via the network.

The memory 402 is configured to temporarily store instructions to be executed by the processor 401 and various data used by the processor 401. The memory 402 may be volatile memory such as SRAM and DRAM or non-volatile memory such as NAND and MRAM. The storage 406 is a storage device that permanently stores data such as hard disk, optical disc, and SSD. The ensemble storage 101 and the observation history storage 102 of FIG. 1 are realized by at least either one of the memory 402 and the storage 406.

The processor 401 reads programs from the memory 402 and executes these programs, and thus the functions of the simultaneous probability density distribution generator 103, the conditional probability density distribution generator 104, the distribution generator 105, and the synthesizer 106 of FIG. 1 are realized.

The external interface 404 is an interface for establishing connections to external devices. Although only one external interface is illustrated in the illustrated example, multiple external interfaces may be incorporated. At least one of the ensemble generator 201, the observer 202, the application device 203, and the output device 204 may be connected to the external interface 404, As has been described in the foregoing, in accordance with this embodiment, the simultaneous probability density distribution of the predicted value and the observed value is generated on the basis of the predicted values and the observed values at multiple times of day. The conditional probability density distribution of the observed values at the prediction target time is generated on the basis of this distribution and the predicted values of the prediction target time. Use of this conditional probability density distribution makes it possible to correctly evaluate the uncertainties of prediction through compensation for the insufficient dispersion that is likely to occur in the ensemble forecasting. In other words, it is made possible to provide prediction that appropriately reflects the uncertainties of weather forecasting.

Second Embodiment

Figure 13:
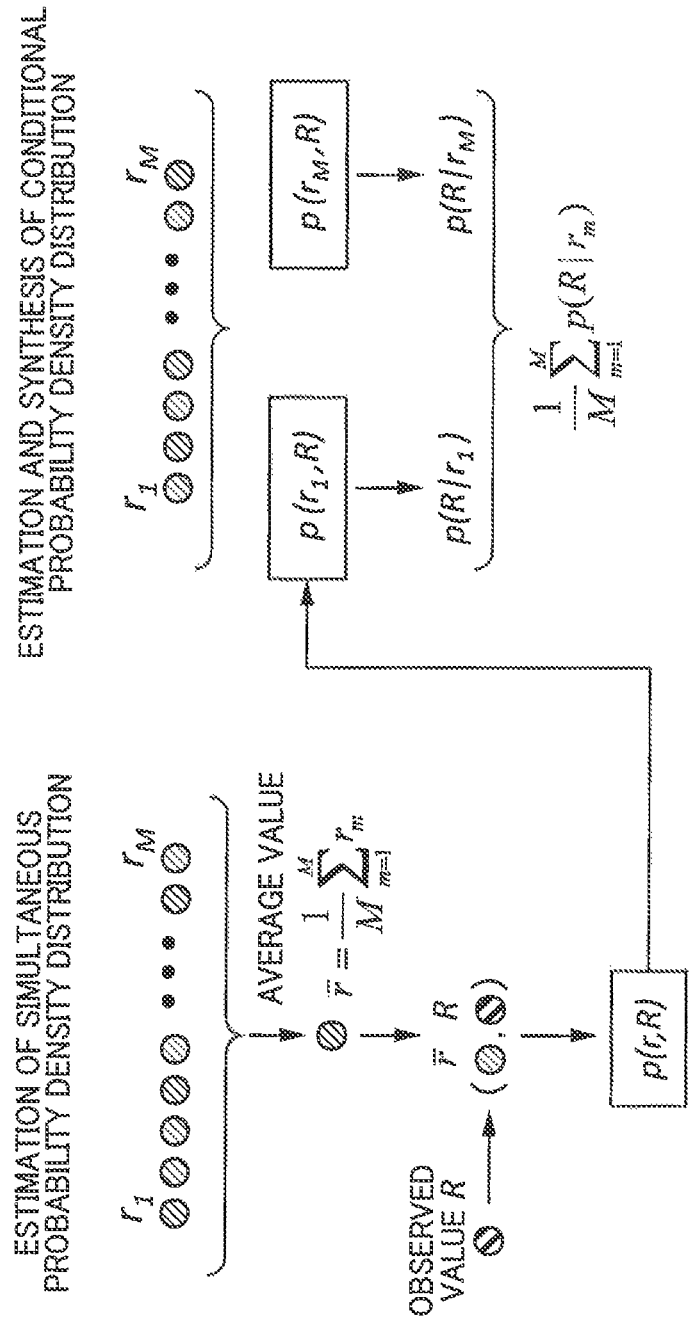
FIG. 13 is a diagram for explanation of operation of the second embodiment.

The second embodiment differs from the first embodiment in generation of the simultaneous probability density distribution and the operation of estimation and synthesis of the conditional probability density distribution. FIG. 13 is an explanatory diagram that explains the simultaneous probability density distribution generation and the operation of estimation and synthesis of the conditional probability density distribution in accordance with the second embodiment.

With regard to the a set of the predicted values $\{r_1, r_2, \ldots, r_M\}$ in the ensemble, the simultaneous probability density distribution generator 103 calculates an average value (which is called "average predicted value") by the following Expression (5) as the representative value of these predicted values.

[Math 23]

$$\bar{r} = \frac{1}{M}\sum_{m=1}^{M} r_m \quad \text{Expression (5)}$$

The simultaneous probability density distribution generator 103 generates the pair of the average predicted value and the observed value $$p=(\bar{r},R) \quad \text{[Math 24]}$$

with regard to each of the multiple times of day. In addition, in the same manner as in the first embodiment, simultaneous probability density distribution p (r, R) is obtained using the kernel density estimation.

The distribution generator 105 of the conditional probability density distribution generator 104 calculates the conditional probability density distribution on the basis of the simultaneous probability density distribution p (r, R) generated by the simultaneous probability density distribution generator 103 and according to the Expression (3) with regard to the predicted values of all the members 1 to M of the ensemble at the prediction target time "t":

$$r_1^{(t)}, r_2^{(t)}, \ldots, r_M^{(t)} \quad \text{[Math 25]}$$

The conditional probability density distribution is represented by:

$$p(R|r_m^{(t)}) \quad \text{[Math 26]}$$

where (m=1, 2, . . . , M) (note that the notation "(t)" is omitted in FIG. 13).

The synthesizer 106 synthesizes the conditional probability density distributions for each member at the prediction target time "t" generated by the distribution generator 105 (See Expression (4)). By virtue of this, the conditional probability density distribution of the observed value R at the prediction target time is obtained.

Third Embodiment

Figure 14:
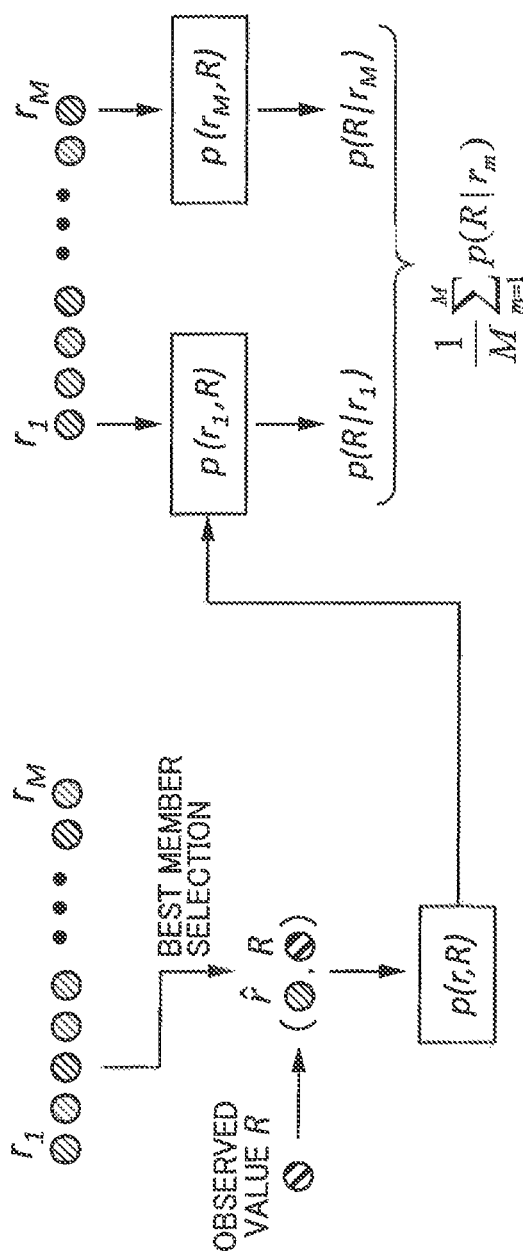
FIG. 14 is a diagram for explanation of operation of the third embodiment.

The third embodiment differs from the first and second embodiments in the simultaneous probability density distribution generation and the operation of estimation and synthesis of the conditional probability density distribution. FIG. 14 is an explanatory diagram that explains the simultaneous probability density distribution generation and the operation of estimation and synthesis of the conditional probability density distribution in accordance with the third embodiment.

The simultaneous probability density distribution generator 103, with regard to the set of the predicted values $\{r_1, r_2, \ldots, r_M\}$ in the ensemble, extracts as a representative value of these predicted values the one predicted value that is the closest to the observed value R. This extracted predicted value is called "best member" which is represented by:

$$\hat{r} \quad \text{[Math 27]}$$

The simultaneous probability density distribution generator 103 generates a pair of the best member and the observed value $$p=(\hat{r},R) \quad \text{[Math 28]}$$

for each of the times of day. Also, in the same manner as in the first embodiment, the simultaneous probability density distribution p (r, R) is obtained using the kernel density estimation.

The distribution generator 105 of the conditional probability density distribution generator 104 calculates the conditional probability density distribution on the basis of the simultaneous probability density distribution p (r, R) generated by the simultaneous probability density distribution generator 103 and according to the Expression (3), with regard to the predicted values of all the members 1 to M at the prediction target time "t":

$$r_1^{(t)}, r_2^{(t)}, \ldots, r_M^{(t)} \quad \text{[Math 29]}$$

The conditional probability density distribution is represented by:

$$p(R|R_m^{(t)}) \quad \text{[Math 30]}$$

(m=1, 2, ... M) (note that the notation "(t)" is omitted in FIG. 11).

The synthesizer 106 synthesizes the conditional probability density distributions for each member at the prediction target time "t" generated by the distribution generator 105 (See Expression (4)). By virtue of this, the conditional probability density distribution of the observed value R at the prediction target time is obtained.

In accordance with the third embodiment, the one predicted value that is the closest to the observed value R among the predicted values is selected as the representative value of the predicted values. Although the second embodiment selects the average value of the predicted values as the representative value, the representative value of the third embodiment is not limited to these values. For example, other values such as mode value and median value may be selected.

Fourth Embodiment

In the first to third embodiments, simultaneous probability density distribution is generated on the basis of the predicted value and the observed value regarding the same meteorological variable (amount of solar radiation or clear sky index) and, based on which the conditional probability density distribution is estimated on a per-member basis. In this embodiment, an example where different meteorological variables are used for the predicted value and the observed value (Example 1) and another example where two or more meteorological variables are used (Example 2).

(Example 1) It is not essential to the generation of the simultaneous probability density distribution to rely on the same meteorological value for the observed value and the predicted value. For example, suppose that the solar irradiance is to be predicted. In this case, the observed value is a solar irradiance but the predicted value does not need to be a solar irradiance. In the numerical weather forecasting, various meteorological variables can be used and an appropriate one or ones can be used therefrom. For example, it is possible that the solar irradiance is used as the observed value and the temperature as the predicted value, pairs of the temperature and the solar irradiance are used to generate the simultaneous probability density distribution.

(Example 2) Two or more meteorological variable can be used to constitute the simultaneous probability density distribution. By way of example, suppose that the clear sky index "r" and the temperature "T" are used as the meteorological variables (which correspond to the first meteorological variable and the third meteorological variable, respectively), and clear sky index should be predicted. The observed value of the clear sky index is represented by "R". The simultaneous probability density distribution generator 103 extracts pairs of the predicted values of the meteorological variables of the ensemble at the time "t", i.e., $$\{(\tilde{r}_1^{(t)}, \tilde{T}_1^{(t)}), (\tilde{r}_2^{(t)}, \tilde{T}_2^{(t)}), \ldots, (\tilde{r}_M^{(t)}, \tilde{T}_M^{(t)})\} \quad \text{[Math 31]}$$

Also, the observed value of the clear sky index at this time (of day) is given as $$\tilde{R}^{(t)} \quad \text{[Math 32]}$$

Then the pairs of the predicted values and the observed values are created as follows.

$$\{\tilde{\rho}_1^{(t)}, \tilde{\rho}_2^{(t)}, \ldots, \tilde{\rho}_M^{(t)}\} = \{(\tilde{r}_1^{(t)}, \tilde{T}_1^{(t)}, \tilde{R}^{(t)}), \ldots, (\tilde{r}_M^{(t)}, \tilde{T}_M^{(t)}, \tilde{R}^{(t)})\} \quad \text{[Math 33]}$$

Here, with regard to $\rho=(r, T, R)$, the following kernel function is defined:

[Math 34]

$$K(\rho; \tilde{\rho}) = \frac{1}{\sqrt{(2\pi)^3 |\Sigma_3|}} \exp\left[-\frac{1}{2}(\rho - \tilde{\rho})^T \sum\nolimits_3^{-1} (\rho - \tilde{\rho})\right] \quad \text{Expression (6)}$$

where

[Math 35]

$$\Sigma_3 = \begin{bmatrix} \sigma_r^2 & 0 & 0 \\ 0 & \sigma_T^2 & 0 \\ 0 & 0 & \sigma_R^2 \end{bmatrix}$$

The simultaneous probability density distribution can be calculated as:

[Math 36]

$$p(r, T, R) = \frac{1}{MN} \sum_{t=t_0}^{t=t_1} \sum_{m=1}^{M} K(\rho; \tilde{\rho}_m^{(t)})$$

in the same manner as Expression (2). "N" represents the number of times of day (number of data) in the range from the past time $t_0$ to the time $t_1$.

Suppose that a solar irradiance at a future time (prediction target time) "t" is to be predicted. The predicted values of the ensemble at the prediction target time "t" is given as:

$$\{(r_1^{(t)}, T_1^{(t)}), (r_2^{(t)}, T_2^{(t)}), \ldots, (r_M^{(t)}, T_M^{(t)})\} \quad \text{[Math 37]}$$

Then the conditional probability density distribution of the observed value R at the prediction target time "t" can be calculated by

[Math 38]

$$p(R \mid r_1^{(t)}, T_1^{(t)}, r_2^{(t)}, T_2^{(t)}, \ldots, r_M^{(t)}, T_M^{(t)}) = \frac{1}{M} \sum_{m=1}^{M} \frac{p(r_m^{(t)}, T_m^{(t)}, R)}{\int_0^1 p(r_m^{(t)}, T_m^{(t)}, R) dR}$$

While certain embodiments have been described, these embodiments have been presented by way of example only, and are not intended to limit the scope of the inventions. Indeed, the novel embodiments described herein may be embodied, in, a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A probabilistic weather forecasting device comprising:
   a network interface;
   a hardware storage configured to receive from one or more external devices, via the network interface:
      a plurality of ensembles associated with a plurality of times, the ensembles having a plurality of members, the members including predicted values of a first meteorological variable, the predicted values being calculated under different conditions, and
      a plurality of observed values of a second meteorological variable measured by a sensor at the times; and
   processing circuitry configured to:
      generate a simultaneous probability density distribution between a predicted value of the first meteorological variable and an observed value of the second meteorological variable, based on the ensembles and the observed values,
      read a plurality of predicted values of the first meteorological variable for a prediction target time as predicted values of the members,
      generate probability density distributions of an observed value of the second meteorological variable with respect to the plurality of members based on the simultaneous probability density distribution and the predicted values of the members,
      weight the probability density distributions and weighted probability density distributions to generate a probability density distribution of an observed value for the prediction target time, and
      output a weather forecast, wherein the weather forecast comprises the probability density distribution of an observed value for the prediction target time, to a display to be presented to a user in a screen or an application device configured to carry out a process based on the probability density distribution.

2. The probabilistic weather forecasting device according to claim 1, wherein the processing circuitry is configured to:
   generate a plurality of pairs between the predicted value of the first meteorological variable and the observed value based on the ensembles and the observed values,
   fit third probability density distributions to the pairs, and
   add up the fitted third probability density distributions to generate the simultaneous probability density distribution.

3. The probabilistic weather forecasting device according to claim 1, wherein the processing circuitry is configured to:
   generate a plurality of pairs between a representative value of the predicted values of the first meteorological variable in the ensemble and the observed value, based on the ensembles and the observed values,
   fit third probability density functions to the pairs, and
   add up the fitted first probability density distributions to generate the simultaneous probability density distribution.

4. The probabilistic weather forecasting device according to claim 3, wherein the representative value is an average value of the predicted values of the first meteorological variable.

5. The probabilistic weather forecasting device according to claim 3, wherein the representative value is the predicted value in which a difference from the observed value of the second meteorological value is smallest among the predicted values of the first meteorological variable.

6. The probabilistic weather forecasting device according to claim 2, wherein the third probability density functions each is a kernel density function.

7. The probabilistic weather forecasting device according to claim 1, wherein the processing circuitry is configured to divide the simultaneous probability density distribution applied by the predicted value of the member by an integral of the simultaneous probability density distribution applied by the predicted value of the member for a possible range of the observed value of the second meteorological variable to generate the probability density distribution of an observed value with respect to the member.

8. The probabilistic weather forecasting device according to claim 1, wherein the first meteorological variable is a meteorological variable that is identical to the second meteorological.

9. The probabilistic weather forecasting device according to claim 1, wherein the first meteorological variable is a meteorological variable that is different from the second meteorological variable.

10. The probabilistic weather forecasting device according to claim 1, wherein the processing circuitry, by further using a plurality of ensembles including a plurality of predicted values of a third meteorological variable, generates a second simultaneous probability density distribution of a predicted value of the first meteorological variable, a predicted value of the third meteorological variable, and an observed value of the second meteorological variable, and
   the processing circuitry generates, based on the second simultaneous probability density distribution, probability density distributions of an observed value of the second meteorological variable with respect to each pair of the predicted values of the first meteorological variable and predicted values of the third meteorological variable for the prediction target time.

11. The probabilistic weather forecasting device according to claim 1, the predicted values of the first meteorological variable are calculated under different conditions of numerical meteorological simulation.

12. The probabilistic weather forecasting device according to claim 1, the second meteorological variable is solar radiation intensity.

13. The probabilistic weather forecasting device according to claim 1, comprising the application device configured to receive the probability density distribution of an observed value for the prediction target time and carry out the process based on the received probability density distribution.

14. The probabilistic weather forecasting device according to claim 1, wherein the application device calculates possibility of insufficiency of an amount of solar radiation.

15. The probabilistic weather forecasting device according to claim 1, wherein the one or more external devices comprise an ensemble generator configured to generate the plurality of ensembles and transmit the generated plurality of ensembles to the hardware storage via the network interface.

16. The probabilistic weather forecasting device according to claim 1, wherein the one or more external devices comprise an observer configured to measure the plurality of observed values of the second meteorological variable and transmit the plurality of observed values of the second meteorological variable to the hardware storage via the network interface.

17. The probabilistic weather forecasting device according to claim 1, wherein the sensor comprises a pyranometer.

18. A probabilistic weather forecasting method comprising:
   receiving from one or more external devices, via a network interface, a plurality of ensembles associated with a plurality of times, the ensembles having a plurality of members, the members including predicted values of a first meteorological variable, the predicted values being calculated under different conditions, and a plurality of observed values of a second meteorological measured by a sensor at the times;

reading the plurality of ensembles associated with the plurality of times;

reading the plurality of observed values of the second meteorological measured by the sensor at the times;

generating a simultaneous probability density distribution between a predicted value of the first meteorological variable and an observed value of the second meteorological variable, based on the ensembles and the observed values;

reading a plurality of predicted values of the first meteorological variable for a prediction target time as predicted values of the members;

generating probability density distributions of an observed value of the second meteorological variable with respect to the plurality of members based on the simultaneous probability density distribution and the predicted values of the members;

weighting the probability density distributions and synthesize the weighted probability density distributions to generate a probability density distribution of an observed value for a prediction target time, and outputting a weather forecast, wherein the weather forecast comprises the probability density distribution of an observed value for the prediction target time, to a display to be presented to a user in a screen.

19. A non-transitory computer readable medium, having a computer program stored therein, which when executed by a computer, causes the computer to perform processing steps of comprising:

receiving from one or more external devices, via a network interface, a plurality of ensembles associated with a plurality of times, the ensembles having a plurality of members, the members including predicted values of a first meteorological variable, the predicted values being calculated under different conditions, and a plurality of observed values of a second meteorological measured by a sensor;

reading the plurality of ensembles associated with the plurality of times and reading the plurality of observed values of the second meteorological measured by the sensor at the times, and generating a simultaneous probability density distribution between a predicted value of the first meteorological variable and an observed value of the second meteorological variable, based on the ensembles and the observed values;

reading a plurality of predicted values of the first meteorological variable for a prediction target time as predicted values of the members generating probability density distributions of an observed value of the second meteorological variable with respect to the plurality of members based on the simultaneous probability density distribution and the predicted values of the members, and weighting the probability density distributions and synthesize the weighted probability density distributions to generate a probability density distribution of an observed value for a prediction target time, and outputting a weather forecast, wherein the weather forecast comprises the probability density distribution of an observed value for the prediction target time, to a display to be presented to a user in a screen.

* * * * *